April 2, 1957 B. T. WEBB 2,787,028
PREFABRICATED ENCLOSURE
Filed Feb. 3, 1954 3 Sheets-Sheet 1

INVENTOR.
BASIL T. WEBB
BY Peck & Peck
ATTORNEYS.

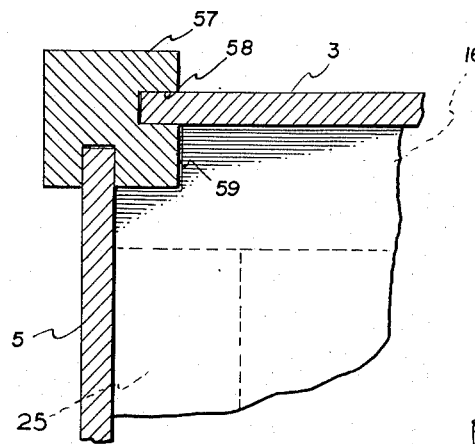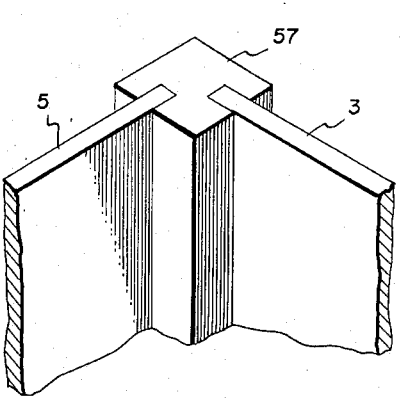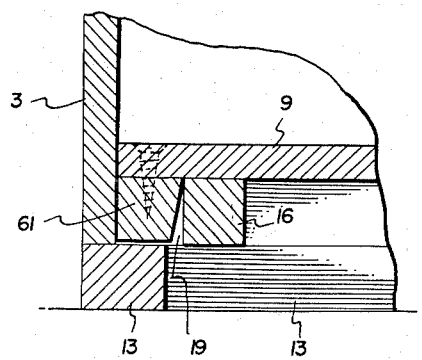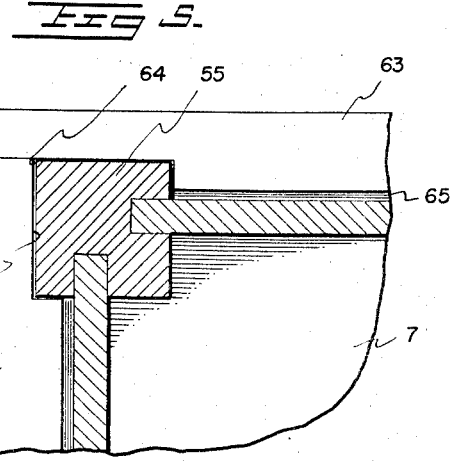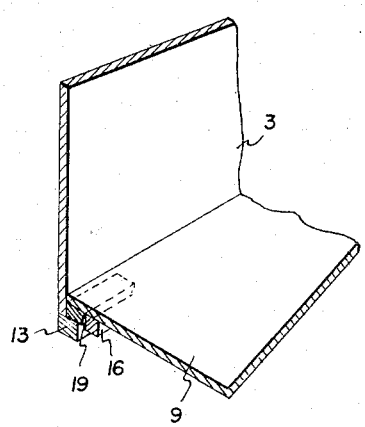

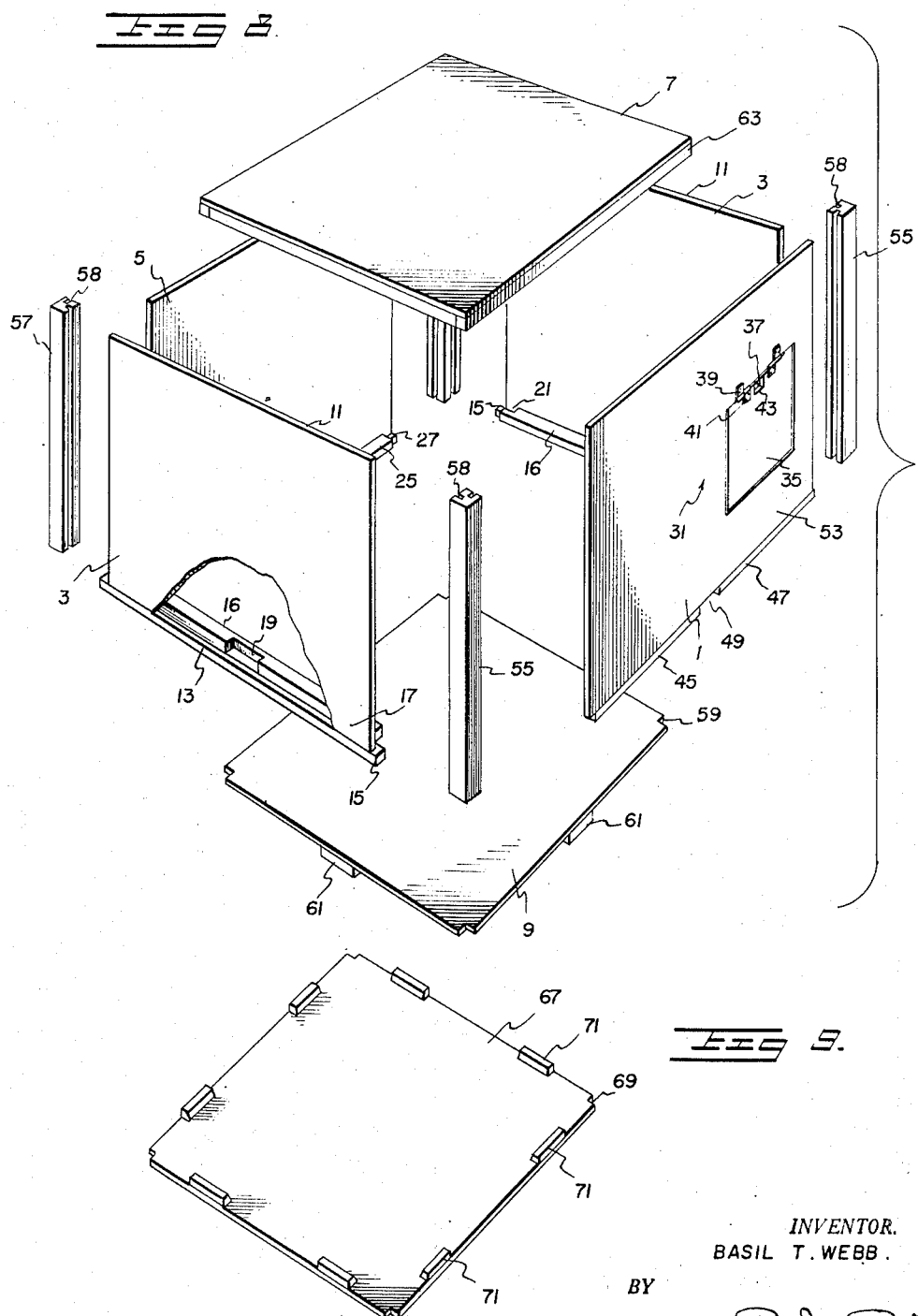

United States Patent Office 2,787,028
Patented Apr. 2, 1957

2,787,028

PREFABRICATED ENCLOSURE

Basil T. Webb, Drexel, Mo.

Application February 3, 1954, Serial No. 407,887

5 Claims. (Cl. 20—2)

This invention relates broadly to prefabricated enclosures, and in its more specific aspects it relates to a shelter for animals which is produced in sections for quick and easy assembly and disassembly; and the nature and objects of the invention will be readily recognized and understood by those skilled in the arts to which it relates in the light of the following explanation and detailed description of the accompanying drawings illustrating what I at present believe to be the preferred embodiments or mechanical expressions of my invention from among various other forms, arrangements, combinations and constructions, of which the invention is capable within the spirit and scope thereof.

My invention may be put to many uses as an enclosing or housing structure, such as children's playhouses, dog houses, cabinets and the like.

I have illustrated in the drawings and shall describe in this specification my prefabricated enclosure adapted for use as a dog house; however, it is to be distinctly understood that my invention may be adapted to other uses without resorting to variation of the basic concept involved and therefore such other uses fall wtihin the spirit and scope of my invention.

It has been one of my primary purposes to devise an enclosure which can be used for animal shelters, playhouses and the like which may be manufactured in sections and shipped in knockdown condition and which may be assembled without tools and with ease and speed. In accomplishing these highly desirable results I have not sacrificed simplicity of parts and assembly and have thereby devised a prefabricated enclosure which may be assembled by any unskilled person.

It will be recognized that prefabricated structures of this character will substantially reduce original costs by permitting quantity production and will likewise substantially reduce costs to the ultimate consumer who will not require the services of a carpenter or other skilled artisan in the final assembly or installation of the enclosure.

One of the many and substantial advantages of my prefabricated enclosure over those of which I am aware, resides in the unique structural arrangement I have provided whereby all of the various prefabricated sections and parts are assembled and releasably interlocked together without requiring the use of any screws, nails or separate securing elements of any character whatsoever. It will be apparent that this desirable feature of my invention greatly expedites and simplifies the assembly operation.

In keeping with my purpose of reducing costs of production and maintaining simplification of assembly I have reduced the number of prefabricated parts to a minimum. As an example of the simplicity of my design a dog house includes only ten sections and parts.

My invention is particularly suitable for use as a shelter for a dog or other animal for it is of substantially square configuration so as to more nearly conform to a dog's shape when he curls up to rest and sleep. Thus, there is little waste space and therefore more of the animal's body heat is kept in the house. I have also provided a door through which the dog may enter and leave the shelter and have provided ventilating means in association with the door which is so positioned that the animal will not be subjected to direct drafts.

The shelter is also provided with a removable roof so that the interior will be readily accessible for cleaning and the like and I have formed the roof as a flat surface providing a sun porch for the animal. This type of roof also eliminates waste air space making it much easier to hold the inside warmth down near the animal.

I have provided the prefabricated sections of this enclosure with means which supports the floor thereof above and off the ground and these means are easily replaceable in the event of deterioration from weather conditions or the like.

This enclosure, when assembled, is sturdy and of enduring construction and under normal usage, even as a child's playhouse, will render long and efficient service.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings,

Fig. 3 is a view taken on the line 3—3 of Fig. 2.

Fig. 4 is a view taken on the line 4—4 of Fig. 2.

Fig. 5 is a view taken on the line 5—5 of Fig. 2.

Fig. 6 is a detailed view of the assembly of adjacent panels in position within a corner post.

Fig. 7 is a detailed view with parts thereof in section of one of the projecting feet of the bottom in position in the receiving notch which is provided on each panel.

Fig. 8 is a view of the various elements of the enclosure in disassembled position prior to being assembled.

Fig. 9 is a perspective view of a modified form of floor.

Figure 1:
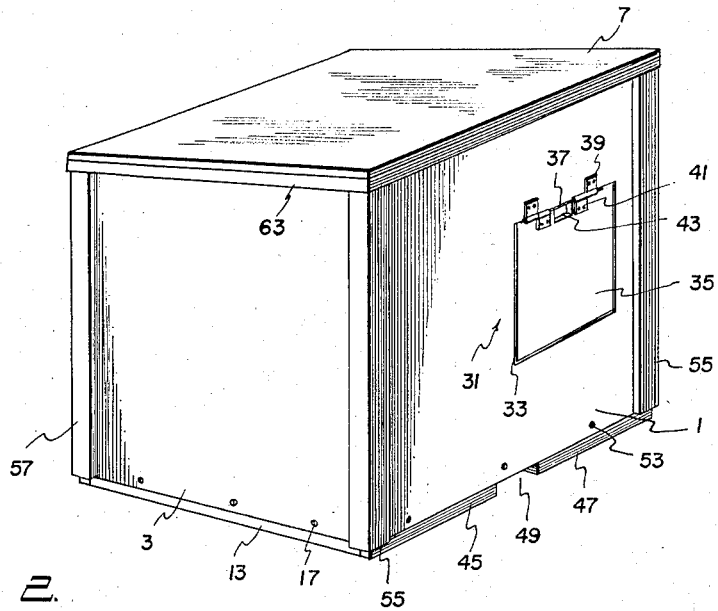
Fig. 1 is a view in perspective of my enclosure in assembled condition to provide a dog house.

In the accompanying drawings I have illustrated my enclosure as providing a dog house, kennel or the like and it is to be distinctly understood that the prefabricated enclosure which I have devised and is hereinafter described in detail may be constructed of sufficient size to provide dog houses of various sizes or a child's play house or the like or cabinet structures. The dog house illustrated in the drawings as an example of one form which my invention may take consists of a plurality of generally rectangular substantially rigid imperforate panels which may be formed of plywood or any other suitable material and which provide a front wall 1, side walls 3, a rear wall 5, a top or roof 7, and a floor 9.

The upper edge 11 of each side forming panel 3 is inclined rearwardly and downwardly from the horizontal for a purpose to be hereinafter described. Each of the side walls 3 is provided with an elongated base or supporting strip 13 upon which the lower edge of each side wall rests for the support thereof, these base supporting strips or elements 13 are of greater length than the width of the side wall so that they project at each end as at 15 beyond each vertical edge of the side wall. I provide a floor supporting and positioning strip or member 16 for each side wall, a member 16 being secured to each side wall 3 by means of screws or the like 17 extending through the side wall panels and into the floor positioning and supporting element. A floor positioning and supporting element 16 is fastened to each side panel in position thereon so that the upper surface of the base member or strip 13 is in engagement therewith and the base member may be secured in the assembly by being nailed, screwed or otherwise secured to the bottom face of the floor positioning and supporting member. The floor supporting and positioning member or ledge 16 is provided with an outwardly directed or outwardly opened notch or mortise 19 which is formed in the member substantially intermediate the ends thereof, and the floor positioning and supporting member 16 is provided at each end with a notch or mortise 21 for a purpose to be hereinafter described.

Thus, each side wall forming panel 3 represents a prefabricated assembly which consists of the wall forming panel which rests on and is supported by the base strip 13 and the assembly further includes the floor positioning and supporting member 16 which is fixed to the panel and from which the base forming strip 13 fixedly depends. If desired the member 16 may also be fixed directly to the wall. It will be recognized that each side assembly consists of these elements which are produced and fixed together at the place of manufacture for shipment to the dealer or ultimate consumer.

The back wall 5 consists of a substantially rigid imperforate wall forming panel which is generally the same as the side wall forming panels with the exception that the upper edge of the back is not inclined from the horizontal. The back wall includes in its assembly a base forming strip or element 23 upon which the lower edge of the back panel 5 rests and is supported, and this base forming strip 23 is of less length than the width of the panel 5. The back assembly also includes a floor supporting and positioning member 25 which is fixed to the back panel 5 by means of screws or the like and is positioned thereon so that it overlies the base strip 23 to which it is securely fastened by means of screws, nails, or the like. The length of the floor supporting and positioning member 25 is reduced relative to the width of the back panel to provide an unoccupied area 27 adjacent each end of the floor supporting and positioning member. The floor supporting and positioning member is provided with a notch or mortise 29 therein which is positioned midway between the ends of the member and is substantially the same as the notches 19 previously described which are formed in the floor supporting and positioning members 16 which form a part of assembly of each side wall.

The front wall forming panel 1 of my prefabricated dog house is provided with an entrance and exit opening and a closure therefor which I have designated in its entirety by the numeral 31. The panel 1 is provided with an opening 33 which I position a substantial distance above the lower edge of the front wall 1 for a purpose which will hereinafter be made clear. I provide a door 35 which is mounted, for free swinging, on a horizontal axis by means of a mounting rod or pintle 37 which may be fastened in position by means of brackets 39, the door 35 having hinge elements 41 which loop over the pintle 37 so that the animal may push the door 35 for free swinging either outwardly or inwardly to permit the animal to either enter or leave the enclosure. I preferably provide a cutout portion 43 in the upper edge of the door as a ventilating aperture for the enclosure.

As a supporting means for the front wall forming panel 1 I provide a pair of separate spaced base supporting strips 45 and 47, the lower edge of the wall forming panel 1 resting on and being supported by the upper surface of these two base supporting strips 45 and 47. Consideration of the drawings and particularly Fig. 1 thereof will illustrate the space 49 which, due to the mounting of these strips, is left between the inner ends thereof. The base supporting strips 45 and 47 are mounted relative to the front wall forming panel 1 so that the outer ends of the edge of these base supporting strips are inwardly spaced from the vertical end edges of the panel 1, these strips being inwardly spaced substantially the same distance as the ends of the base supporting strip 23 of the back wall panel are inwardly spaced from the vertical end edges of said panel. I mount a bottom or floor positioning and supporting strip or element 51 on the front wall panel 1 by means of screws or the like 53, the floor positioning and supporting element 51 being provided with a notch intermediate the ends thereof which is the same as the notches which have been previously described on the floor positioning and supporting elements which are fastened to the sides and back of the dog house. The floor positioning and supporting element 51 of the front wall overlies the base supporting strips 45 and 47, and these base supporting strips are fastened to the lower surface of the floor positioning and supporting strip or element 51, the element 51 being the same length as the element 25 which is fastened to the back wall so that it is of reduced length relative to the width of the front wall panel and, therefore, leaves an unoccupied area at each end thereof.

I provide a pair of front corner posts 55 and a pair of rear corner posts 57, the two pairs of posts being of similar construction with the exception that the rear corner posts are of reduced height or length relative to the front corner posts in order to take care of the reduced height of the enclosure at the rear end thereof resulting from the inclination of the top edges of the side walls 3. Each corner post is preferably constructed in square configuration and is provided with a longitudinally extending groove 58 on two adjacent walls thereof.

I provide a substantially rigid imperforate bottom or floor for my enclosure which is of substantially rectangular shape and of dimensions adapted to snugly fit within the four walls of the enclosure when they are assembled into completed enclosure forming position as will hereinafter be described. The floor or bottom 9 is provided with a notch 59 at each corner thereof and adjacent each edge of the floor 9 and midway between the ends thereof I provide a projection or tenon 61 which may be screwed, nailed or otherwise secured to the floor to project downwardly therefrom.

Figure 2:
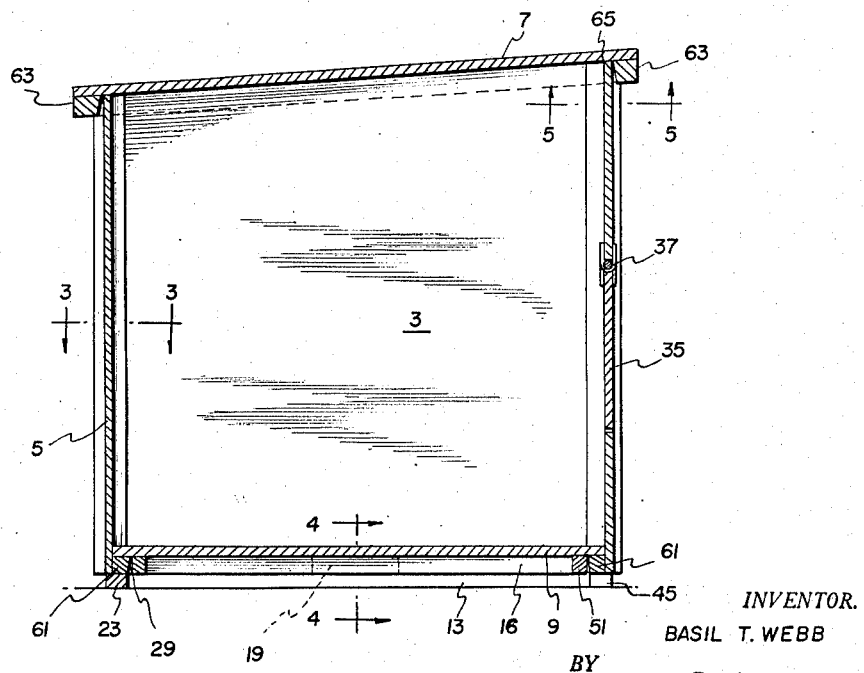
Fig. 2 is a vertical section through the enclosure or dog house illustrated in Fig. 1.

I provide a top member 7 for my prefabricated dog house or other enclosure which consists of a generally rectangular substantially rigid imperforate element which may be formed of plywood or the like material and which is of sufficient dimensions so that it will removably rest or be supported on the top edges of the wall forming panels when they have been assembled as will be hereinafter described. The top is formed with four depending strips or lips 63, one being fixed in any suitable manner to extend along the under surface of the top adjacent each edge thereof as is clearly illustrated in Fig. 2 of the drawings. Each strip 63 is preferably formed with a downwardly and outwardly extending bevel 65 and each strip 63 is notched at each end as at 64 to accommodate the tops of the corner posts. The dimensions of the top and the relative positioning of the strips 63 thereon is such that when the top is assembled into the unit, the strips will extend along the outer surfaces of the wall forming panels in relatively snug relation with respect thereto to properly mount in a removable manner the top on the dog house or other enclosure.

It will appreciated that the various elements which have been described in detail above are furnished to the assembler of a dog house or the like unit in prefabricated condition, all of the various supporting and positioning strips being permanently fastened into position so that all the assembler of the dog house need do is to connect together or assemble these various elements in the following manner.

The assembler of the dog house or other enclosure who has been supplied with the prefabricated elements takes the left side panel 3 and stands it upright on its base supporting strip 13, with the floor or bottom positioning member 16 inwardly disposed and with the highest portion of the top edge 11 nearest to him. The assembler next takes one of the long corner posts 55 and inserts the top of the front vertical edge of the panel 3 into the lower open end of the groove 58 in the corner post 55 and slides this post down on this front edge, it will be clear that the other groove in the corner post must face inwardly. When the front edge of the side wall 3 has been fully received within the groove 58 of the corner post, the front forming wall panel 1 is erected so that it rests on its base supporting strips 45 and 47 whereupon it is slid until the left vertical edge thereof is received in the groove of the corner post which has been associated with the left wall forming panel 3. When the front wall has been assembled as described, the other side wall forming panel 3 is stood erect on its base supporting strip and the other or long front corner post 55 is slid on the front vertical edge of said side wall forming panel 3 until the vertical edge is fully received within the groove 58 of the corner post whereupon the right wall forming panel 3 with its corner post associated therewith is slid toward the other side wall panel 3 and the front wall panel until the right vertical edge of the front wall is received in the other groove of the right front corner post 55. The two side walls and the front wall having been assembled as described, the two short corner posts 57 are now slid down on the back vertical edges of each side wall 3 with the open grooves thereof facing each other. When the short rear corner posts 57 are positioned on the side walls as described the side walls may be slightly spread apart so that the back wall 5 may be placed between these rear short corner posts 57 and then the side walls brought toward each other until the vertical edges of the back wall are fully received within the grooves in the corner posts 57. With the four walls of the dog house assembled as described, the floor or bottom 9 is inserted from above within the space defined by the walls with the projections 61 directed downwardly and the floor 9 is pushed downwardly until each projection 61 is received within the notches which are formed in the floor positioning and supporting strips which are fastened to each wall forming panel. When this has been accomplished, the top 7 is placed on the top horizontal edges of the wall forming panels and the unit is ready for use. It is preferable that the notches or recesses in the floor supporting and positioning strips be somewhat longer than the length of the projections on the floor. This will provide for ease of assembly and also allow air to enter the enclosure through the space between the inner ends of the two base supporting strips which are fixed on the lower edge of the front panel.

From the description of the various prefabricated parts of my enclosure and the method of assembly thereof it will be clear that there is a snug mating of the floor positioning strips, the base strips and the corner posts where the wall panels come together due to the reduced length of the floor positioning strips on the back and front panels which leaves a free area for the projecting ends of the floor positioning strips on the side panels. The ends of the base supporting strips on the front and back walls abut against the projecting ends of these base supporting strips on the side walls and the bases of the corner posts fit in the notch which is provided therefor at the ends of each floor positioning strip on the side walls. Thus, I have devised a unique arrangement wherein the panels and their associated structure snugly mate together at the meeting points thereof.

The simplicity of the assembly of the prefabricated elements into an enclosure will be readily recognized and it will be appreciated that the entire unit is assembled into completed condition without using any screws, nails or the like fastening elements and without requiring the use of any tools whatsoever. The various prefabricated elements are maintained in assembled position by means of the corner posts and the floor which keeps the wall forming panels from spreading apart due to the reception of the projections on the floor within the notches which are provided on each floor supporting and positioning strip. Due to the unique construction of the base supporting strips which are provided on the lower edge of each wall forming panel in combination with the floor supporting and positioning strips it will be understood that the unit itself will be raised above the ground or other supporting surface and that the floor will be positioned substantially above the ground. The advantages flowing from such construction will be apparent when it is understood that the enclosure may be used in damp places and this construction keeps the housed animal well above the ground dampness. I have provided for substantial interior ventilation through the opening 43 in the door 35 and also through the free space 49 which is in alignment with the notch which is provided in the floor supporting and positioning strip 51 of the front wall panel 1. Thus, the air may circulate through the dog house by means of these ventilating openings.

In Fig. 9 of the drawings I have illustrated another form of floor member 67. This member is provided with the corner cutouts or notches 69 and is provided with a spaced pair of projections or tenons 71 along each edge instead of the single tenon 61 which is used in that form of my invention illustrated in Figs. 1 through 8. When a floor of the character of that designated by the numeral 67 is used, the floor positioning and supporting strip which is fixed to each panel is provided with a pair of notches rather than the formerly described single notch and these notches are so positioned in these floor supporting and positioning strips that when the floor 67 is inserted into the area defined by the assembled walls, the notches 71 will be received in the pair of notches provided on the floor positioning and supporting strips. Since I contemplate providing these prefabricated elements for dog houses, play houses and the like of considerable size, it may be desirable in certain installations to use the form of floor illustrated and described in Fig. 9 of the drawings.

I claim:

1. An enclosure including in combination, prefabricated wall forming panel members adapted to be removably fastened together, and means removably associated with the vertical edges of adjacent panels for connecting the panels together, and a floor member for the enclosure, said floor member provided with at least one downwardly extending rigid projection adjacent each edge thereof, a floor positioning and supporting element fixed to the inner surface of each wall adjacent the lower edge thereof and each of said elements being provided with a recess therein providing an unobstructed area for loosely and removably receiving a projection to thereby removably maintain the panels and the floor in assembled enclosure forming position.

2. An enclosure including in combination, prefabricated wall forming panel members adapted to be removably fastened together, and means removably associated with the vertical edges of adjacent panels for connecting the panels together, and a floor member for the enclosure, said floor member provided with at least one downwardly extending rigid block like projection adjacent each edge thereof, a floor positioning and supporting element fixed to the inner surface of each wall adjacent the lower edge thereof and each of said elements being provided with a recess therein of greater dimensions than the projection and adapted to receive therein a projection to thereby removably maintain the panels and the floor in assembled enclosure forming position, and a base supporting member fixed to each of said elements and extending beneath the lower edge of each panel for supporting the enclosure, and at least one of said base supporting members having an opening therethrough in communication with one of said recesses to allow air to flow to and from the enclosure.

3. An enclosure including in combination, prefabricated wall-forming panel members adapted to be removably fastened together, and means associated with the vertical edges of adjacent panels for connecting the panels together and a floor member for the enclosure, said floor member being provided with a solid rigid block-like projection adjacent each edge thereof, a floor positioning and supporting element fixed to the inner surface of each wall adjacent the lower edge thereof and each of said elements being provided with a notch therein extending from the outer edge of the floor positioning and supporting member inwardly but spaced from the inner edge thereof, said notch adapted to loosely and removably receive a projection to thereby removably maintain the panels and the floor in assembled enclosure forming position.

4. An enclosure in accordance with claim 3, wherein a roof is provided for the enclosure, said roof including a body portion supported on the top edges of said panels and a depending peripheral flange on said roof having the inner surfaces thereof bevelled.

5. An enclosure including in combination, prefabricated wall forming pane members adapted to be removably fastened together, and means removably associated with the vertical edges of adjacent panels for connecting the panels together, and a floor member for the enclosure, said floor member provided with at least one downwardly extending rigid block-like projection adjacent each edge thereof, an elongated floor positioning and supporting element fixed to the inner surface of each wall panel adjacent the lower edge thereof, each floor positioning and supporting element being approximately the same length as the width of the wall panel to which it is fixed and extending inwardly therefrom, each of said floor positioning and supporting elements being provided with a recess therein of greater dimensions than the dimensions of the projections and adapted to receive therein a projection to removably maintain the wall panels and the floor in assembled enclosure forming position, and an elongated base supporting member fixed to each of said elements and extending beneath the lower edge of each wall panel for supporting the enclosure, and each of said base supporting members being of greater length than said floor positioning and supporting elements, and at least one of said base supporting members having an opening therethrough in communication with one of said recesses to allow air to flow to and from the enclosure.

References Cited in the file of this patent

UNITED STATES PATENTS

| | | |
|---|---|---|
| 525,157 | Proctor | Aug. 28, 1894 |
| 1,661,482 | Kuhne | Mar. 6, 1928 |
| 2,329,611 | Hedrick | Sept. 14, 1943 |
| 2,332,312 | Foster | Oct. 19, 1943 |
| 2,470,403 | Klomparens | May 17, 1949 |
| 2,498,411 | Geib | Feb. 21, 1950 |